United States Patent [19]
Donatelli

[11] 3,746,875
[45] July 17, 1973

[54] ELECTRICAL POWER PLANT DRIVEN BY OCEAN WAVES AND TIDES

[76] Inventor: Joseph Donatelli, 2624 Mozart St., Los Angeles, Calif. 90031

[22] Filed: Aug. 4, 1972

[21] Appl. No.: 277,876

[52] U.S. Cl.................. 290/42, 290/43, 290/53, 290/54, 417/330, 417/333
[51] Int. Cl............................................ F03b 13/12
[58] Field of Search ............... 240/42, 43, 53, 54; 417/330, 331, 332, 333

[56] References Cited
UNITED STATES PATENTS
1,393,472   10/1921   Williams............................. 290/42
988,508   4/1911   Reynolds............................. 290/42

Primary Examiner—G. R. Simmons
Attorney—Herbet A. Huebner, Thomas A. Fournie et al.

[57] ABSTRACT

A four-way power plant operable to generate electrical energy both from the up and down two-directional movement of the ocean surface and also from the two-directional flow of the ocean towards and away from a shore includes fixed structure mounted on the ocean floor and a floating platform slidably connected with the fixed structure. Electricity is generated from mechanism, preferably gears, driven by the up and down movement of the platform and from other mechanism, preferably paddle wheels, driven by the flow of water directed across the platform.

10 Claims, 7 Drawing Figures

Patented July 17, 1973 3,746,875

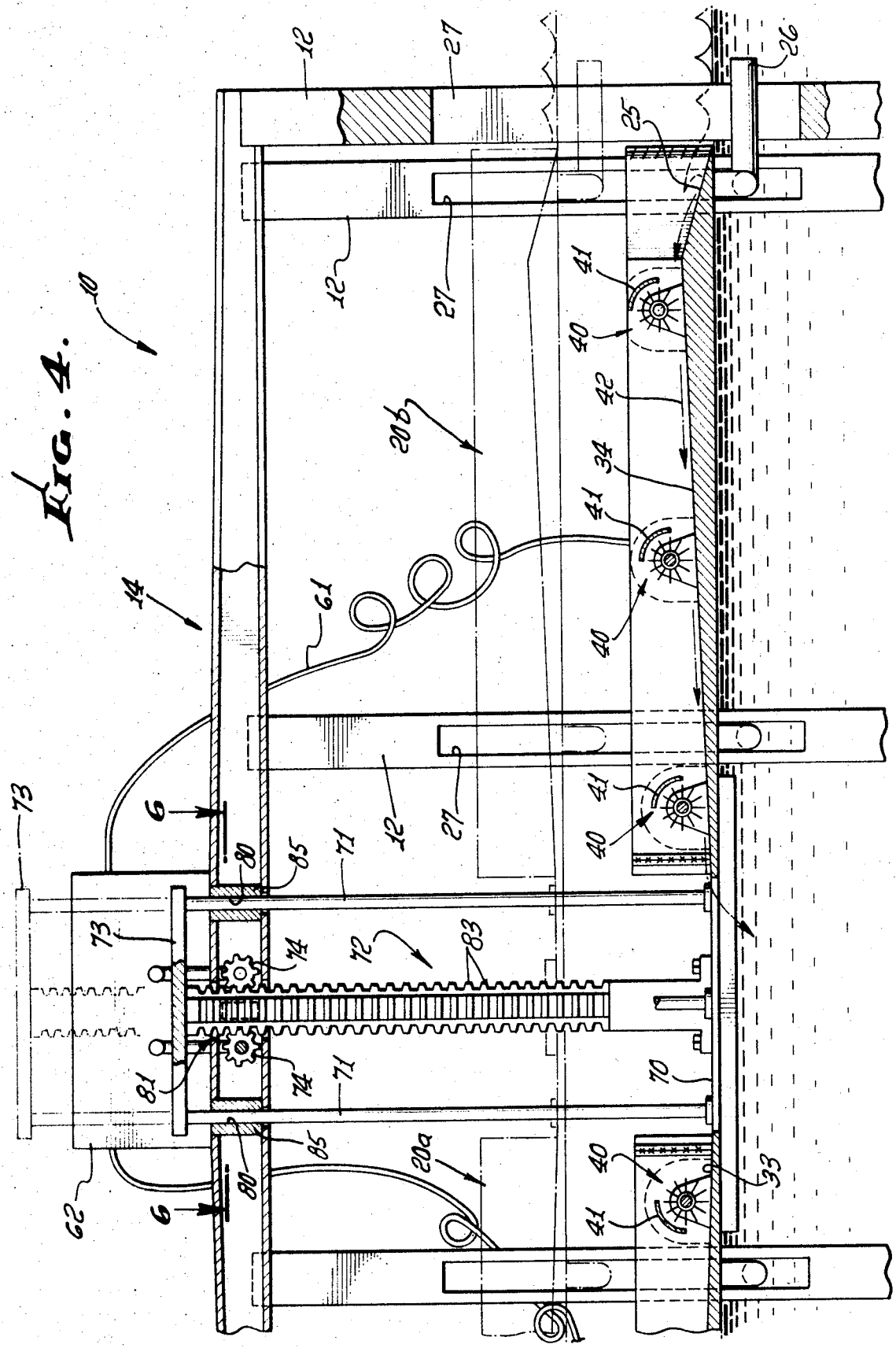

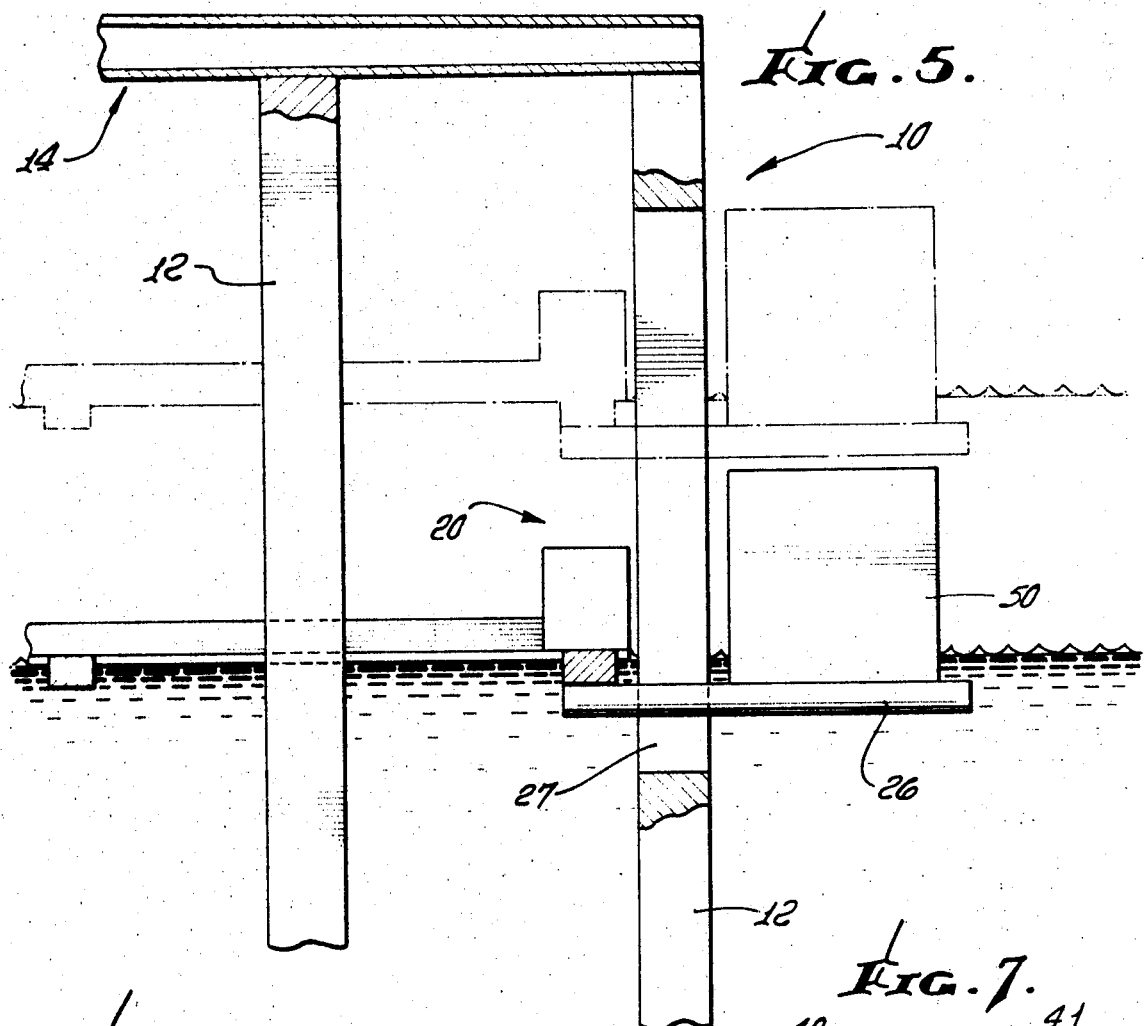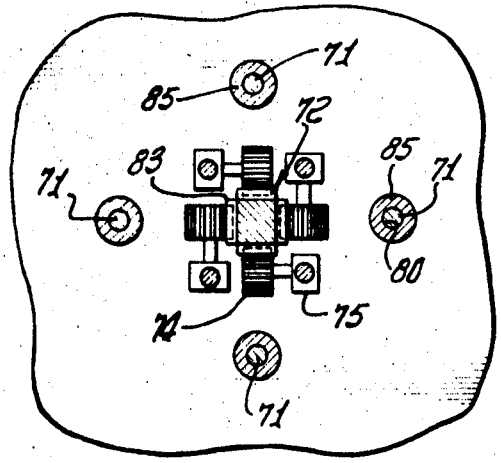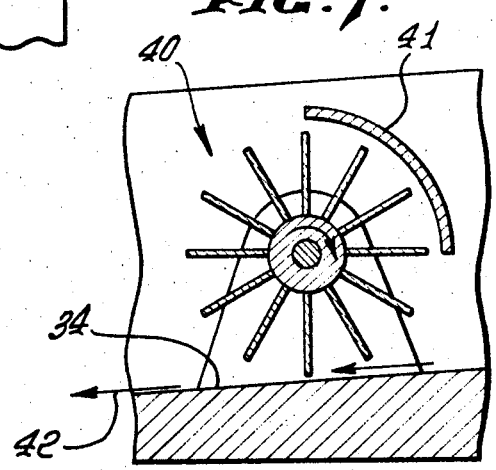

ELECTRICAL POWER PLANT DRIVEN BY OCEAN WAVES AND TIDES

BACKGROUND OF THE INVENTION

The present invention relates to power plants for generating electricity and more particularly to an improved electrical power plant which is driven by ocean waves and tides.

Heretofore, various arrangements have been devised to generate electrical power from ocean waves and tides. Such prior art devices, however, have generally been impractical and have failed to utilize the full force and energy of the ocean waves and tides.

SUMMARY OF THE INVENTION

It is, accordingly, an object of the present invention to provide an improved power plant for generating electrical energy which is simultaneously driven by both ocean waves and tides.

It is further an object of the present invention to provide an improved power plant as set forth which is operable to generate electrical energy both from the up and down two-directional movement of the ocean surface as caused by waves and tides and also from the two-directional flow of ocean waves and tides towards and away from an ocean shore.

In accomplishing these and other objects, there is provided in accordance with the present invention fixed structure mounted on the ocean floor. A floating platform is slidably connected with the fixed structure to float up and down with the ocean waves and tides. One generating mechanism is included which is driven by the up and down movement of the floating platform to generate electricity. The fixed structure is orientated to hold a landward edge portion of the floating platform towards a selected ocean shore and a seaward edge portion of the floating platform away from the selected shore. The platform is preferably constructed to slope from an elevated position above water surface from both its seaward and landward edge portions towards its center, thereby to define first and second paths of water flow. Structure is provided to channel ocean waves over the platform seaward and landward edge portions so that water flows along the first and second paths. Other generating mechanisms, preferably including paddle wheels, are mounted across the first and second paths of flow to be driven by the water flowing therealong, thereby to generate electrical energy from the flow of waves and tides towards and away from the shore. An opening is defined in the platform center for discharging the water flowing across the first and second paths back into the ocean. Means are included for summing the electrical energy being simultaneously produced by the generating mechanisms.

Thus, a four-way electrical power plant is provided which operates to simultaneously generate electrical energy both from the up and down two-directional movement of the ocean surface as caused by changes in the levels of waves and tides and also from the two-directional flow of ocean waves and tides towards and away from shore.

Additional objects of the present invention reside in the specific construction of the exemplary electrical power plant hereinafter particularly described in the specification and shown in the several drawings.

BRIEF DESCRIPTION OF THE DRAWINGS

FIG. 4 is a view taken along the line 4—4 of FIG. 2.
FIG. 5 is a view taken along the line 5—5 of FIG. 2.
FIG. 6 is a view taken along the line 6—6 of FIG. 4.
FIG. 7 is a side elevation view of one of the paddle wheels mounted on the floating platform of the power plant of FIG. 1 illustrating the flow of water thereunder to rotate the paddle wheel.

DETAILED DESCRIPTION OF THE PREFERRED EMBODIMENT

Figure 1:
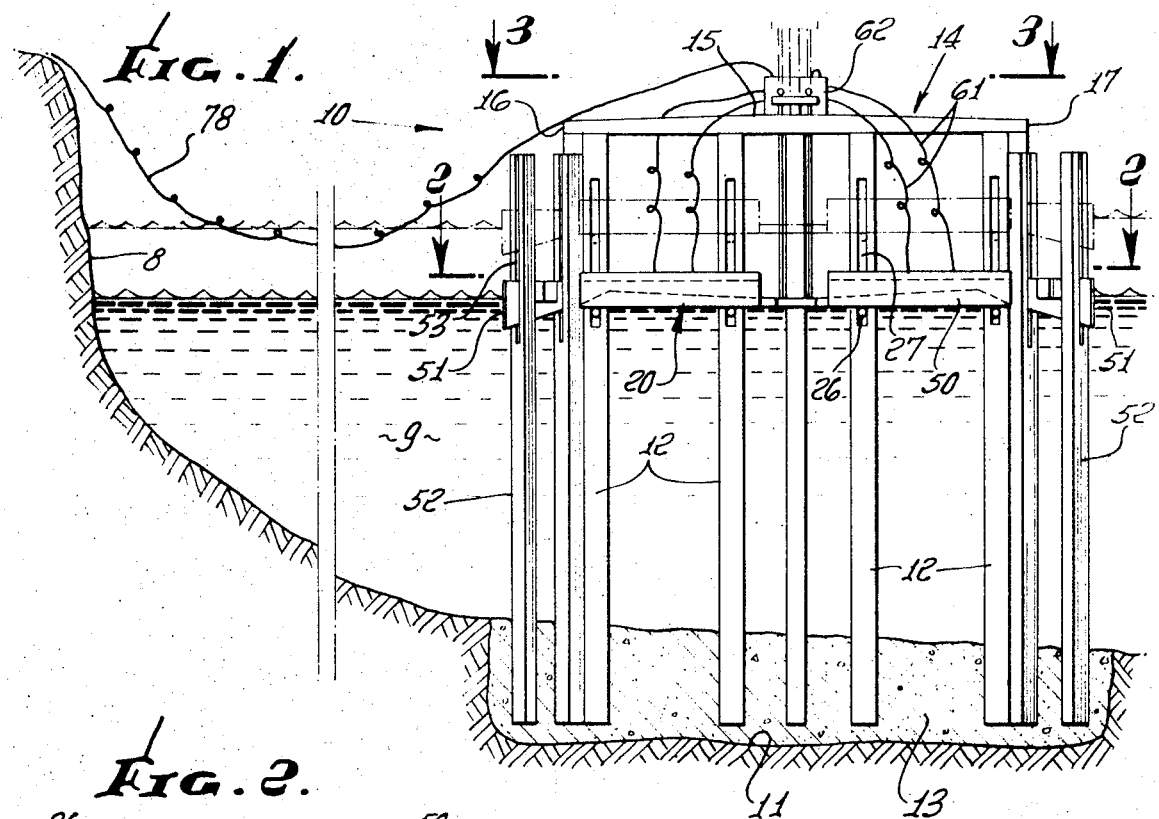
FIG. 1 is a side elevation view of an electrical power plant according to the present invention mounted on ocean floor adjacent a selected shore.

Referring to the drawings in more detail, there is shown in FIG. 1 an electrical power plant generally designated by the numeral 10. The power plant 10 includes fixed structure 12 mounted on the floor 11 of the ocean 9 adjacent an ocean shore 8. The fixed structure 12 illustrated is made up of a plurality of vertically extending supports or uprights, selected ones of which are identified in the drawings also by the numeral 12. 16 uprights 12 are shown in the drawings positioned with respect to each other to define a rectangular, preferably square, pattern which may measure, for example, approximately 150 feet on each side. Four uprights define each side of this fixed structure 12, and the square defined by the uprights 12 is orientated to have a seaward side facing the flow of waves and tides towards the ocean shore 8 and an opposed landward side facing the flow of waves and tides away from the shore 8.

The uprights 12 are rigidly anchored in place on the ocean floor 11, preferably in concrete 13. The uprights 12 extend from the ocean floor 11 to a selected height above the ocean surface, which height is sufficient to permit a floating platform means 20, hereinafter described, to move up and down with changes in the level of the ocean 9 without contacting a roof 14 mounted on the upper end of the fixed structure 12. The roof 14 is preferably square and is secured or mounted on the upper ends of the uprights 12. The roof 14 is preferably positioned to have one side edge 16 facing landward and its opposed side edge 17 facing seaward, as shown in FIG. 1. The central portion 15 of the roof 14, with respect to the landward and seaward roof edges 16 and 17, is preferably flat and the roof 14 slopes from this flat portion 15 downwardly to its landward and seaward edges 16 and 17, respectively.

Figure 2:
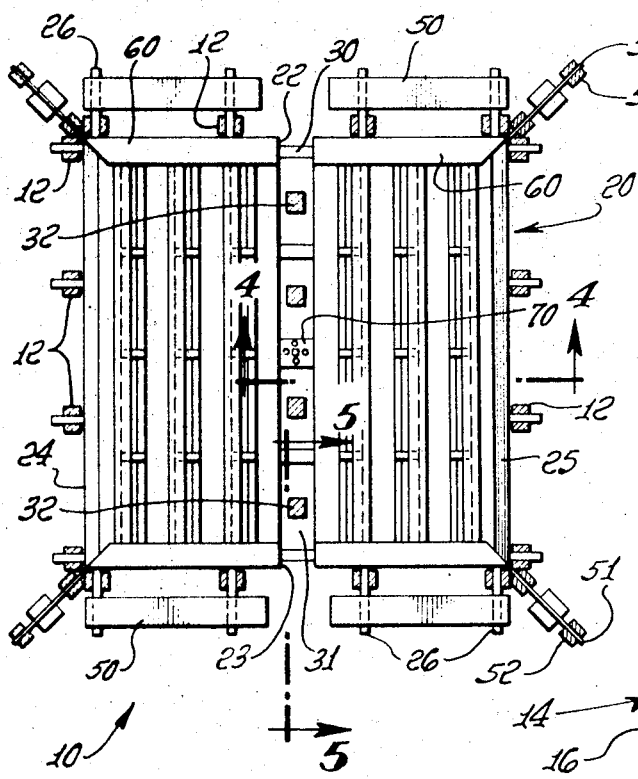
FIG. 2 is a view taken along the line 2—2 of FIG. 1.

Positioned within the uprights 12 is the floating platform 20. The platform 20 is square in shape to conform with the square area defined by the uprights 12. As shown in FIG. 2, the platform 20 has side edges 22 and 23, a landward facing edge portion 24, and a seaward facing edge portion 25. Arms 26 extend horizontally from each of the edges of the platform 20. Each of the arms 26 is associated with one of the uprights 12 and a vertically extending slot 27 is defined in each upright 12 for slidably receiving the arms 26. The slot 27 extends from a point slightly below the lowest level of the surface of the ocean 9 to a point approximately equal to the highest level of the ocean surface. The slots 27 terminate at a point sufficiently below the roof 14 so that the platform means 20 or structure carried thereby never contacts the roof 14. The arms 26 are preferably cylindrical in shape so as to not bind in the slots 27. It is noted that the platform 20 is shown in FIGS. 1, 4 and 5 floating on the ocean surface in two vertical spaced apart positions. The upper position shown in phantom represents the position of the platform 20 relative to the fixed structure 12 when the level of the ocean 9 is at its highest point while the lower position of the platform 20 shown in solid lines represents the position of the platform 20 relative to the fixed structure 12 when the level of the ocean 9 is at its lowest point.

The platform 20 is made up of a landward half 20a and a seaward half 20b. The landward and seaward halves 20a and 20b are interconnected by bridging members 30 and a central substantially rectangular discharge opening 31 extends the width of the platform 20 between the platform halves 20a and 20b. It is also noted that a plurality of additional supports 32 preferably extend upwardly through the opening 31 to contact the underside of the flat portion 15 of the roof 14. Thereby, additional support is provided for the roof 14. Four roof supports 32 are shown in FIG. 2.

A cross sectional view of the platform half 20b is shown in FIG. 4. As there shown, the seaward edge 25 of the platform half 20b slopes upwardly to a point of predetermined height and then slopes downwardly along a ramp 34 to the central discharge opeing 31. The ramp 34 defines a first path of flow for water across the platform 20. Paddle wheels 40, preferably three, are shown mounted on the platform half 20b, one of which is shown in enlarged scale in FIG. 7. The paddle wheels 40 are positioned with their longitudinal axes parallel to the seaward edge portion 25 of the platform 20b at spaced apart points along the water flow path 34 to extend transversely thereacross. As shown in FIG. 4, water 42 is channeled up the short ramp defined by the edge portion 25 and then flows down the longer path 34 under the paddle wheels 40. Thereby, the paddle wheels 40 are rotated. It is noted that cover members 41 are mounted adjacent the paddle wheels 40 to shield the upper half of the paddle wheel 40 from the water flowing onto the platform half 20b over the edge portion 25. Thereby, each paddle wheel 40 is only rotated by this flow of water in the direction indicated by the arrow in FIG. 7. It is further noted that by spacing the blades of the paddle wheels closer together that more power will be developed by the paddle wheels 40 due to the increased contact between their blades and the flowing water 42. The water 42, after driving the paddle wheels 40, discharges back into the ocean 9 through the opening 31 in the platform 20. It is noted that the upper edge of the side of the platform half 20b defining the central opening 31 is positioned a slight distance above the ocean surface so that the water 42 discharges downwardly into the ocean 9.

The landward half 20a of the platform 20 is designed to face landward instead of seaward but otherwise is constructed in the same manner as the platform half 20b. Three paddle wheels 40 are also mounted on the platform half 20a. The paddle wheels 40 are positioned parallel to the landward edge 24 at spaced apart points along the second water flow path defined by ramp 33 to extend transversely thereacross. Water flowing down the path 33 flows under the paddle wheels 40 and discharges through the central opening 31 in the platform 20. Cover members 41 are mounted adjacent the paddle wheels 40 on the platform half 20a to shield the upper halves of the wheels 40 from the water flowing over the platform edge portion 24. Thereby, these paddle wheels 40 are only driven in one direction of rotation by the flow of water down the second water flow path 33.

The platform means 20 includes floats 50 mounted on the arms 26 extending from the side edges 22 and 23 of the platform halves 20a and 20b. Four floats 50 are shown and these floats preferably are air tanks. The floats 50 maintain the platform 10 in floating position on the ocean surface. Mounted to extend in a symmetrical manner from the corners of the platform 20 are fins 51. Each fin 51 is designed to extend at its outer end from a point a predetermined distance below the water surface to a predetermined height above the water surface and to taper along its bottom edge upwardly towards the platform 20. The fins 51 extend preferably at 135° angles to the platform edge portions 24 and 25 and are each slidably mounted in a pair of uprights 52.

The uprights 52 are anchored by the concrete 13 on the ocean floor 11 and have vertically extending slots 53 formed therein in which the fins 51 may slidably move as the platform 20 is moved up and down by changes in the level of the ocean surface. Floats 54, preferably in the form of air tanks, are mounted or secured on the fins 51 between the uprights 52 to support the fins 51 on the ocean surface. The fins 51 function to channel waves and tides flowing towards the platform edge portions 24 and 25 thereover, thereby to create flows of water along the paths 33 and 34 on the platform 20 to drive the paddle wheels 40. It is noted that additional structure may be also mounted on the platform 20 for directing water over its edge portions 24 and 25, such as ramps sloping downwardly under the ocean surface from the platform edge portions 24 and 25.

Mounted to extend along the side edges 22 and 23 of each of the platform halves 20a and 20b are electrical generating means 60. Each of the electrical generating means 60 are made up of a plurality of electrical generators housed in a watertight housing. The shafts of the paddle wheels 40 extend through the watertight housing of the generating means 60 and are there connected to drive the generators housed therein. The current generated by each of the generators in the electrical generating means 60 is summed therein and is outputted on the electrical leads or cables 61. The leads 61 are of a conventional coiled type which may expand and retract in length and are connected from the generating means 60 to a conventional summing means 90 mounted on the upper side of the flat roof surface 15.

Rigidly mounted on a plate 70 centrally located to extend across the opening 31 between the platform halves 20a and 20b are a plurality of upright guide rods or posts 71, preferably four, and a gear post 72. The gear post 72 has gear teeth 83 and extends vertically in a central position between the upright guide rods 71. The guide rods 71 and gear post 72 extend upwardly through vertically extending channels 80 and 81, respectively, defined through the flat roof portion 15. The openings 80 are defined by sleeves 85 which define bearing surfaces to guide the up and down movement of the guide rods 71. A plate 73 interconnects the upper ends of the guide rods 71 and gear post 72 to maintain them in a parallel spaced apart relationship with respect to each other. Gears 74, preferably four, are mounted within the portion 15 of the roof 14 to be driven by the gear teeth 83 from the up and down movement of the gear post 72.

Figure 3:
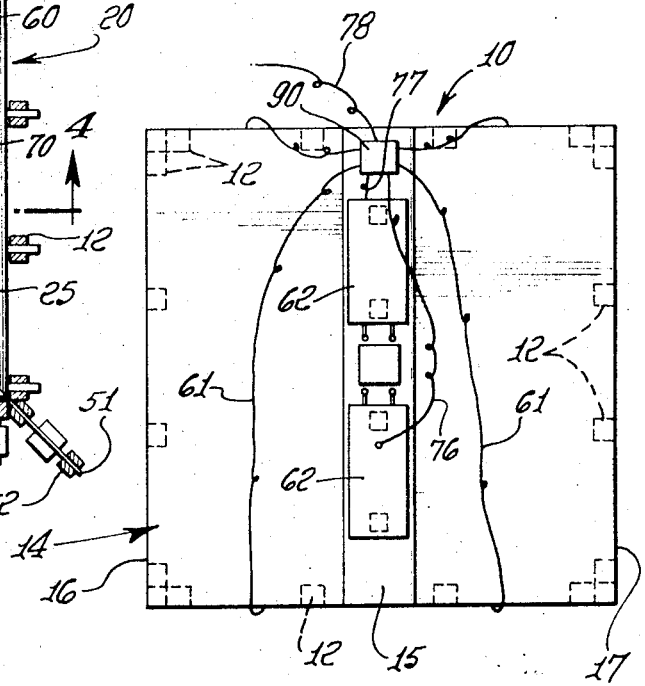
FIG. 3 is a view taken along the line 3—3 of FIG. 1.

As shown in FIGS. 3, 4 and 6, the gears 74 are connected through conventional gear boxes 75 to two electrical generating means 62 mounted on the roof portion 15. The electrical generating means 62 are each made up of at least one electrical generator housed in a watertight housing and a conventional switching arrangement is included in the generating means 62 so that the electricity generated from both the up and down movement of the gear post 72 is summed in phase.

The outputs of the electrical generating means 62 are outputted on electrical cables or leads 76 and 77. The leads 76 and 77 are connected to the summing means 90. The summing means 90 sums together in phase the electrical outputs of each of the electrical generating means 60 and 62, and the output of the summing means 90 is transmitted over electrical cable 78 to the shore 8. Thereby, the sum total of the electrical energy being simultaneously generated by the power plant 10 from rotation of the paddle wheels 40 and the gears 74 is transmitted through the power line 78 to shore.

Thus, an improved four-way electrical power plant 10 is provided which operates to generate electrical energy both from the up and down two-directional movement of the ocean surface as caused by waves and tides and also from the two-directional flow of ocean waves and tides towards and away from a beach.

Although I have herein shown and described my invention in what I have conceived to be the most practical and preferred embodiment, it is recognized that departures may be made therefrom within the scope of my invention.

I claim:

1. A power plant for generating electricity from ocean waves and tides, comprising:
   platform means floating on ocean surface adjacent a selected ocean shore, said platform means having edge portions and being shaped to be positionable with one of its edge portions facing the flow of waves and tides towards the selected ocean shore and one other of its edge portions facing the flow of waves and tides away from the selected ocean shore;
   structure means mounted on ocean floor in a fixed position and slidably interconnected with said platform means for guiding in a substantially vertical path the up and down movement of said floating platform means caused by changes in the level of the ocean surface and for maintaining said platform means orientated with said one edge portion facing the flow of waves and tides towards the selected ocean shore and said other edge portion facing the flow of waves and tides away from the selected ocean shore;
   means associated with said platform means for directing waves and tides flowing against said one edge portion along a first path of flow across said platform means and for directing waves and tides flowing against said other edge portion along a second path of flow across said platform means;
   first generating means mounted on said platform means to be driven by the flow of water along said first path of flow for generating electrical energy from the flow of waves and tides towards the selected ocean shore;
   second generating means mounted on said platform means to be driven by the flow of water along said second path of flow for generating electrical energy from the flow of waves and tides away from the selected ocean shore;
   third generating means connected between said structure means and said platform means to be driven by the up and down movement of said platform means relative to said structure means for generating electrical energy from the changes in level of the ocean surface; and
   means for summing the electrical energy generated by said first, second and third generating means.

2. The invention defined in claim 1, wherein:
   said first generating means includes at least one paddle wheel means and at least one electrical generator, said one paddle wheel means being positioned across said first path of flow and being connected to drive its associated electrical generator; and
   said second generating means includes at least one other paddle wheel means and at least one other electrical generator, said other paddle wheel means being positioned across said second path of flow and being connected to drive its associated electrical generator.

3. The invention defined in claim 1, wherein:
   said first generating means includes a plurality of first paddle wheel means and a plurality of first electrical generators, said first paddle wheel means being positioned substantially parallel with respect to each other at spaced apart points along said first path of flow to extend transversely thereacross, each of said first paddle wheel means being connected to drive at least one of their associated electrical generators; and
   said second generating means includes a plurality of second paddle wheel means and a plurality of second electrical generators, said second paddle wheel means being positioned substantially parallel with respect to each other at spaced apart points along said second path of flow to extend transversely thereacross, each of said second paddle wheel means being connected to drive at least one of their associated electrical generators.

4. The invention defined in claim 1, wherein:
   said first generating means comprises at least one paddle wheel means and at least one electrical generator, said one paddle wheel means including a first paddle wheel positioned across said first path of flow to be rotated by the flow of water thereunder and a first cover member positioned to shield the upper half of said first paddle wheel from the flow of water, said one paddle wheel means being connected to drive its associated electrical generator; and
   said second generating means comprises at least one other paddle wheel means and at least one other electrical generator, said other paddle wheel means including a second paddle wheel positioned across said second path of flow to be rotated by the flow of water thereunder and a second cover member positioned to shield the upper half of said second paddle wheel from the flow of water, said other paddle wheel means being connected to drive its associated electrical generator.

5. The invention defined in claim 1, wherein said third generating means includes gear means, mechanism for driving said gear means, and at least one electrical generator, said gear means and said driving mechanism being connected in driving engagement with each other between said structure means and said platform means to be moved relative to each other by the up and down movement of said platform means relative to said structure means, said gear means being connected to drive said electrical generator.

6. The invention defined in claim 1, wherein:

said structure means includes a plurality of uprights having vertically extending slots of predetermined length defined therein;

said platform means includes arms positioned in slidable engagement with said slots to interconnect said floating platform means with said structure means so that the up and down movement of said platform means caused by changes in the level of the ocean surface is guided in a substantially vertical path.

7. The invention defined in claim 1, wherein said means for directing waves and tides along said first and second paths across said platform means includes fin structure mounted on said platform means to direct water onto said platform means, inclined surfaces formed on said platform means to channel the flow of water directed onto said platform means along either said first or said second path, and an opening defined in said platform means for discharging water back into the ocean after its flow across either said first or second path.

8. A power plant for generating electricity from ocean waves and tides, comprising:

rectangular platform means floating on ocean surface adjacent a selected ocean shore, said platform means having seaward and landward edge portions and defining an opening substantially midway between said seaward and landward edge portions through which water may be discharged into the ocean, said seaward and landward edge portions sloping upwardly to a predetermined height above ocean surface, said platform means sloping downwardly from said predetermined height of said seaward and landward edge portions to said discharge opening to define, respectively, first and second paths of water flow across said platform means;

structure means mounted on ocean floor in a fixed position and slidably interconnected with said platform means for guiding in a substantially vertical path the up and down movement of said floating platform means caused by changes in the level of the ocean surface and for maintaining said platform means orientated with said seaward edge portion facing the flow of waves and tides towards the selected ocean shore and said landward edge portion facing the flow of waves and tides away from the selected ocean shore;

fin structure mounted at the corners of said platform means for directing waves and tides flowing against said seaward edge portion along said first path of flow across said platform means and for directing waves and tides flowing against said landward edge portion along said second path of flow across said platform means;

first generating means mounted on said platform means to be driven by the flow of water along said first path of flow for generating electrical energy from the flow of waves and tides towards the selected ocean shore;

second generating means mounted on said platform means to be driven by the flow of water along said second path of flow for generating electrical energy from the flow of waves and tides away from the selected ocean shore;

third generating means connected between said structure means and said platform means to be driven by the up and down movement of said platform means relative to said structure means for generating electrical energy from the changes in the level of the ocean surface; and means for summing the electrical energy generated by said fist, second and third generating means.

9. The invention defined in claim 8, wherein:

said first generating means comprises at least one paddle wheel means and at least one electrical generator, said one paddle wheel means including a first paddle wheel positioned substantially parallel with said seaward edge portion across said first path of flow to be rotated by the flow of water thereunder and a first cover member positioned to shield the upper half of said first paddle wheel from the flow of water, said one paddle wheel means being connected to drive its associated electrical generator;

said second generating means comprises at least one other paddle wheel means and at least one other electrical generator, said other paddle wheel means including a second paddle wheel positioned substantially parallel with said landward edge portion across said second path of flow to be rotated by the flow of water thereunder and a second cover member positioned to shield the upper half of said second paddle wheel from the flow of water, said other paddle wheel means being connected to drive its associated electrical generator; and said third generating means includes gear means, mechanism for driving said gear means, and at least one electrical generator, said gear means and said driving mechanism being connected in driving engagement with each other between said structure means and said platform means to be moved relative to each other by the up and down movement of said platform means relative to said structure means, said gear means being connected to drive its associated electrical generator.

10. The invention defined in claim 9, wherein:

said structure means includes a plurality of uprights having vertically extending slots of predetermined length defined therein; and said platform means includes air tanks for maintaining it floating on ocean surface and arms positioned in slidable engagement with said slots to interconnect said floating platform means with said structure means so that the up and down movement of said platform means caused by changes in the level of the ocean surface is guided in a substantially vertical path.

* * * * *